United States Patent
Kaku et al.

(10) Patent No.: US 8,672,387 B1
(45) Date of Patent: Mar. 18, 2014

(54) UTILITY VEHICLE

(71) Applicant: Kawasaki Jukogyo Kabushiki Kaisha, Hyogo (JP)

(72) Inventors: Hidetoshi Kaku, Kakogawa (JP); Yoshinori Tsumiyama, Miki (JP); Tyler Furman, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/729,932

(22) Filed: Dec. 28, 2012

(51) Int. Cl.
*B60R 9/00* (2006.01)

(52) U.S. Cl.
USPC ........................................ 296/65.05

(58) Field of Classification Search
USPC ............... 296/37.6, 37.1, 183.1, 26.09, 37.8, 296/100.18, 3; 320/109; 180/65.29; 224/404, 281, 403, 542
See application file for complete search history.

(56) References Cited

U.S. PATENT DOCUMENTS

| | | | | |
|---|---|---|---|---|
| 3,169,792 A | * | 2/1965 | Solano Viquez | 296/99.1 |
| 4,917,430 A | * | 4/1990 | Lawrence | 296/37.6 |
| 5,439,150 A | * | 8/1995 | Trahms | 224/404 |
| 5,464,264 A | * | 11/1995 | Wilson | 296/37.6 |
| 6,905,159 B1 | | 6/2005 | Saito et al. | |
| 6,994,388 B2 | | 2/2006 | Saito et al. | |
| 7,249,798 B2 | | 7/2007 | Saito et al. | |
| 7,516,998 B1 | * | 4/2009 | Berg et al. | 296/65.01 |
| 7,578,544 B1 | * | 8/2009 | Shimamura et al. | 296/183.2 |
| 7,658,411 B2 | * | 2/2010 | Davis et al. | 280/783 |
| 7,735,889 B2 | * | 6/2010 | Yamamura et al. | 296/24.43 |
| 7,735,896 B2 | * | 6/2010 | Kubota | 296/69 |
| 7,841,639 B2 | * | 11/2010 | Tanaka et al. | 296/65.05 |
| 7,874,606 B2 | * | 1/2011 | Yamamura et al. | 296/64 |
| 7,926,862 B2 | * | 4/2011 | Smith et al. | 296/64 |
| 7,950,486 B2 | * | 5/2011 | Van Bronkhorst et al. | 180/89.11 |
| 8,152,215 B1 | * | 4/2012 | Tsumiyama et al. | 296/63 |
| 8,322,772 B1 | * | 12/2012 | Gilbeck et al. | 296/37.15 |
| 8,328,261 B2 | * | 12/2012 | Kanazawa et al. | 296/24.43 |
| 8,414,082 B2 | * | 4/2013 | Nakamura et al. | 298/17 R |
| 2002/0175007 A1 | * | 11/2002 | Strong | 180/54.1 |
| 2008/0191506 A1 | * | 8/2008 | Huotari et al. | 296/37.6 |
| 2012/0235395 A1 | * | 9/2012 | Davis et al. | 280/783 |
| 2012/0303397 A1 | * | 11/2012 | Prosser | 705/7.12 |

\* cited by examiner

*Primary Examiner* — Kiran B Patel

(74) *Attorney, Agent, or Firm* — Wenderoth, Lind & Ponack, L.L.P.

(57) ABSTRACT

A utility vehicle according to the present invention includes a chassis, a ROPS surrounding a space on the chassis, a seat or a seat row arranged in the space, a cargo bed provided in a rear part of the chassis, and one or more resin storage boxes provided between the seat or the seat row and the cargo bed in the front and rear direction in the space, the storage boxes being integrated with parts of vehicle-side covers covering side parts of the space.

8 Claims, 9 Drawing Sheets

UTILITY VEHICLE

BACKGROUND OF THE INVENTION

1. Field of the Invention

The present invention relates to a utility vehicle, particularly to a utility vehicle having a chassis, a ROPS surrounding a space on the chassis, a seat or a seat row arranged in the space, and a cargo bed arranged in a rear part of the chassis.

2. Description of the Related Art

The present applicant filed applications of the inventions relating to a utility vehicle, including, for example, U.S. Pat. No. 6,905,159, U.S. Pat. No. 6,994,388, and U.S. Pat. No. 7,249,798.

In utility vehicles shown in the above documents, a front seat and a rear seat are arranged in a space covered by a ROPS, and a cargo bed is arranged behind the rear seat. The rear seat can be changed from a use state to a stowed state, and the cargo bed can be expanded forward into the space when the rear seat is in the stowed state.

In addition to the above conventional examples, there are a utility vehicle having a non-expandable cargo bed and a non-stowable fixed rear seat, and a two-seater utility vehicle having no rear seat.

In any type of the above utility vehicles, gravel, wood, game, or other transporting objects are loaded on the cargo bed as a matter of course, and personal belongings of a passenger such as hunting equipment, food, clothes, outdoor cooking utensils, or the like are loaded on the cargo bed, the rear seat in which no passenger is seated, or the like.

However, the cargo bed does not have a hood, and the space in the ROPS is exposed to rain. Although there is a utility vehicle in which a roof is provided in a head of the ROPS, four side surfaces of the space are opened, so that an interior of the ROPS is almost exposed to rain.

Therefore, in a case where clothes, food, outdoor cooking utensils, or the like are loaded, there is a need for putting a sheet on the cargo or accommodating the cargo in a container brought from an exterior in order to avoid scatter of water, mud, or the like.

SUMMARY OF THE INVENTION

An object of the present invention is to provide a utility vehicle capable of easily accommodating a cargo to be loaded into a state that the cargo can be protected from mud or water of an exterior and reducing the number of parts forming an outer peripheral part of a vehicle.

In order to achieve the above object, a utility vehicle according to the present invention includes a chassis, a ROPS surrounding a space on the chassis, a seat or a seat row arranged in the space, a cargo bed provided in a rear part of the chassis, and one or more resin storage boxes provided between the seat or the seat row and the cargo bed in the front and rear direction in the space, the storage boxes being integrated with parts of vehicle-side covers covering side parts of the space.

With the above configuration, in addition to the existing cargo bed, the storage boxes capable of protecting the cargo from mud, water, or the like of the exterior are provided in the space in the ROPS. Thus, the cargo accommodated in the storage boxes can be protected from mud or water of the exterior without separately putting a sheet or the like. For example, clothes and the like of a passenger can be easily loaded in a state that mud or water does not scatter on the clothes and the like. Furthermore, the storage boxes are integrated with the parts of the vehicle-side covers. Thus, the number of parts for surrounding the outer peripheral part of the vehicle can be reduced.

In the above utility vehicle, the following structures can be preferably adopted.

(a) The utility vehicle has a right storage box and a left storage box, a right wall of the right storage box forms a part of the right vehicle-side cover, and a left wall of the left storage box forms a part of the left vehicle-side cover.

With the above configuration, in comparison to a case where a storage box ranging over the entire width of the vehicle is manufactured, a mold can be simplified and downsized.

(b) In the structure having the pair of left and right storage boxes, a tray for disposing a cooler box is provided between the left and right storage boxes.

With the above configuration, a space between the left and right storage boxes can be effectively utilized for disposing the cooler box.

(c) In the structure in which the tray is arranged between the left and right storage boxes, the tray is provided with a hook onto which a rubber or a string for fixing the cooler box is caught.

With the above configuration, fall-down of the cooler box due to vibration of the vehicle can be prevented, and by elastically fixing, a cooler box having different size and shape can be fixed in a stable state.

(d) An opening narrower than a trunk part of the storage box is formed in a head of each of the storage boxes.

With the above configuration, water or mud does not easily invade the storage boxes at the time of running in a marshy place or the like.

(e) Each of the storage boxes has a lid in the head opening, and the lid is formed in such a manner that a rear end of the lid is opened and closed taking a front end hinge portion of the lid as a pivot center.

With the above configuration, at the time of opening and closing the lid, a backrest of a front seat is not disturbing, and even with a higher storage box, the lid is easily opened and closed.

(f) The storage boxes are formed to be higher than a floor surface of the cargo bed.

With the above configuration, capacity of the storage boxes can be increased.

(g) As other embodiment, height of the storage boxes can be the same as or lower than a bottom surface of the cargo bed.

With the above configuration, by opening a front plate of the cargo bed, upper surfaces of the storage boxes can be utilized as an extended part of the bottom surface of the cargo bed, so that a cargo longer than the cargo bed can be loaded.

DETAILED DESCRIPTION OF THE INVENTION

Figure 1:
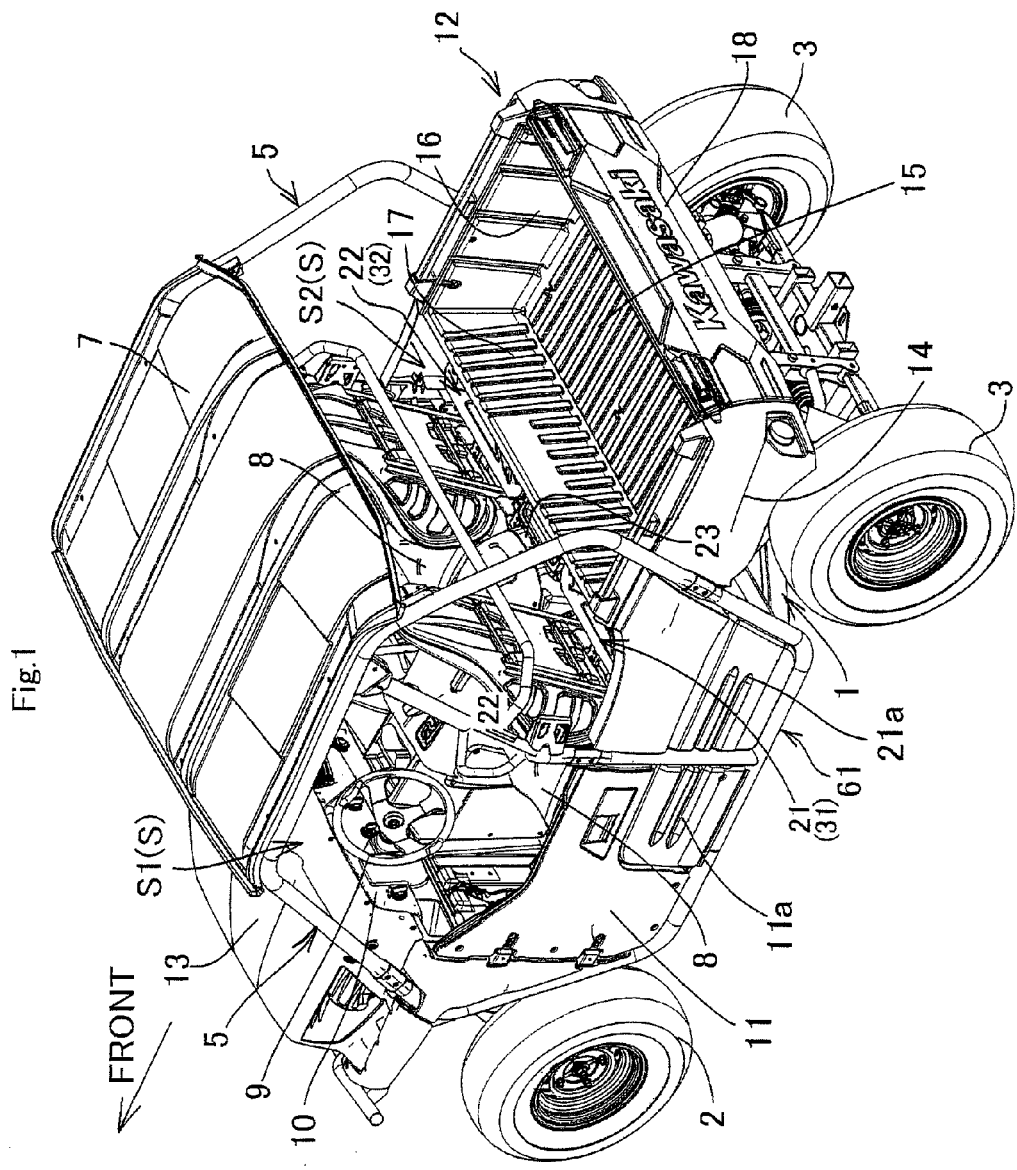
FIG. 1 is a perspective view of a utility vehicle according to the present invention.

Based on FIGS. 1 to 12, an embodiment of the present invention will be described. FIG. 1 is a perspective view of a utility vehicle according to the present invention. A pair of left and right front wheels 2 is provided in a front part of a chassis 1, and a pair of left and right rear wheels 3 is provided in a rear part of the chassis 1. A space S on the chassis 1 between the front wheels 2 and the rear wheels 3 is surrounded by a ROPS 5 having a roof 7. The space S has a riding space S1 on the front portion and a storage space S2 on the rear portion. In the riding space S1, a front seat row including a pair of left and right front seats 8, a handle 9, a dashboard 10, and the like are arranged. In the storage space S2, a pair of left and right storage boxes 21, 22 is arranged. A dumping type cargo box 12 is provided behind the storage space S2, and a bonnet 13 is provided in front of the riding space S1. The cargo bed 12 includes a bottom plate 15, a pair of left and right side panels 16, a front panel 17, and a gate type rear panel 18, and the rear panel 18 can be opened and closed. It should be noted that for convenience of description, the right and left sides seen from a passenger in a vehicle correspond to the right and left sides of the vehicle in the following description.

The ROPS 5 is an abbreviation of a rollover protective structure provided with a pair of left and right metal side frame units formed in a substantially E shape, and a plurality of cross members for coupling both the side frame units. A lower end of the ROPS 5 is connected to a pair of left and right metal ROPS support frames 61 formed in a W shape, the ROPS support frames facing the lower end from below. The ROPS support frames 61 are secured to the chassis 1.

Left and right side parts of the riding space S1 are covered by a pair of left and right doors 11 and front exterior covers 11a. Left and right side parts of the cargo bed 12 are covered by a pair of left and right cargo exterior covers 14. Upper half parts of left and right side parts of the storage space S2 are covered by a pair of left and right rear exterior covers 19, and lower half parts of the left and right side parts of the storage space S2 are covered by side covers 21a, 22a (refer to FIG. 10) integrated with side surfaces of the storage boxes 21, 22.

Figure 2:
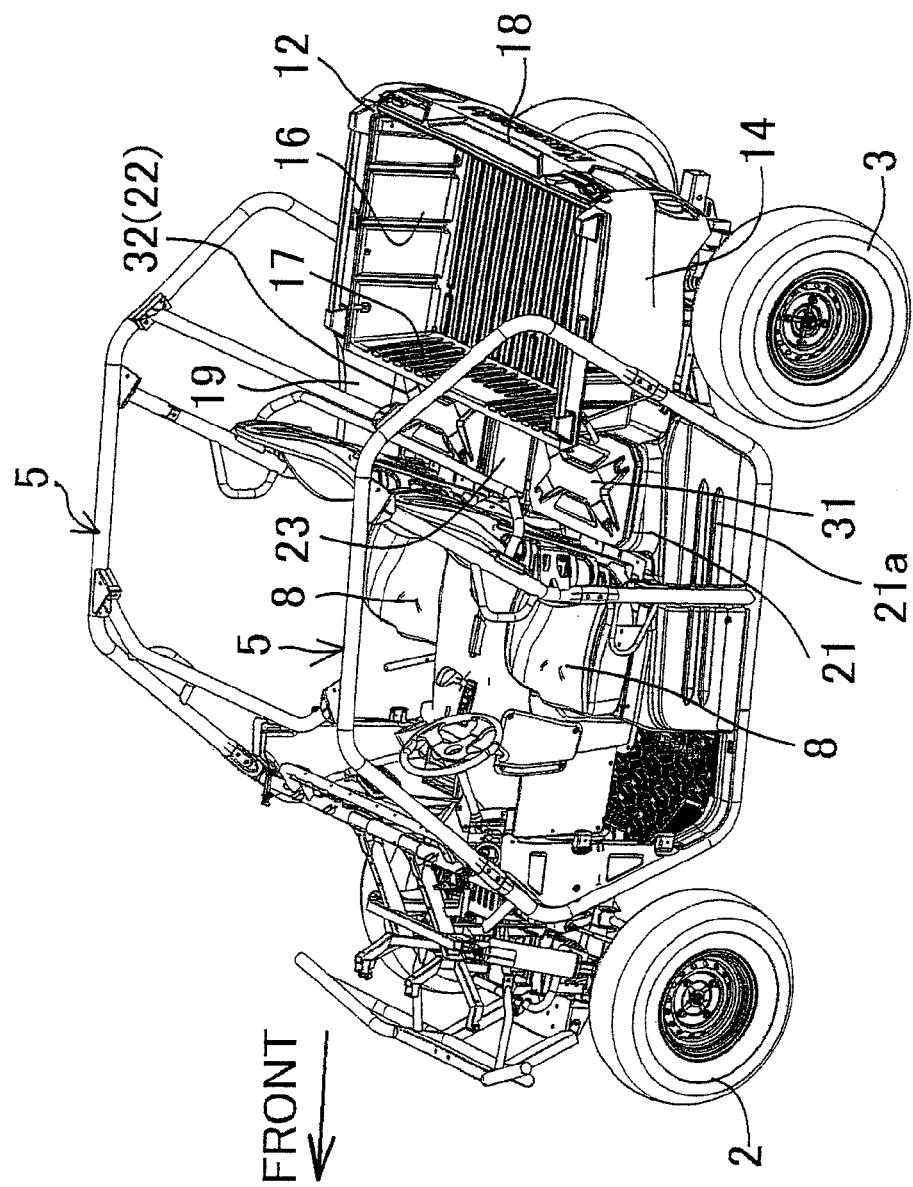
FIG. 2 is a perspective view of the utility vehicle of FIG. 1 shown as covers and the like of an exterior are removed.

FIG. 2 is a perspective view of the same vehicle as FIG. 1 shown as the bonnet 13, the left and right doors 11, the left rear exterior cover 19, and the like of FIG. 1 are removed. Lids 31, 32 are respectively arranged on upper surfaces of the left and right storage boxes 21, 22, and front ends of the lids 31, 32 are pivotably supported on front ends of the upper surfaces of the storage boxes 21, 22 by hinge mechanisms. Thereby, rear ends of the lids 31, 32 are opened upward taking the hinge mechanisms of the front ends as pivot points.

Figure 3:
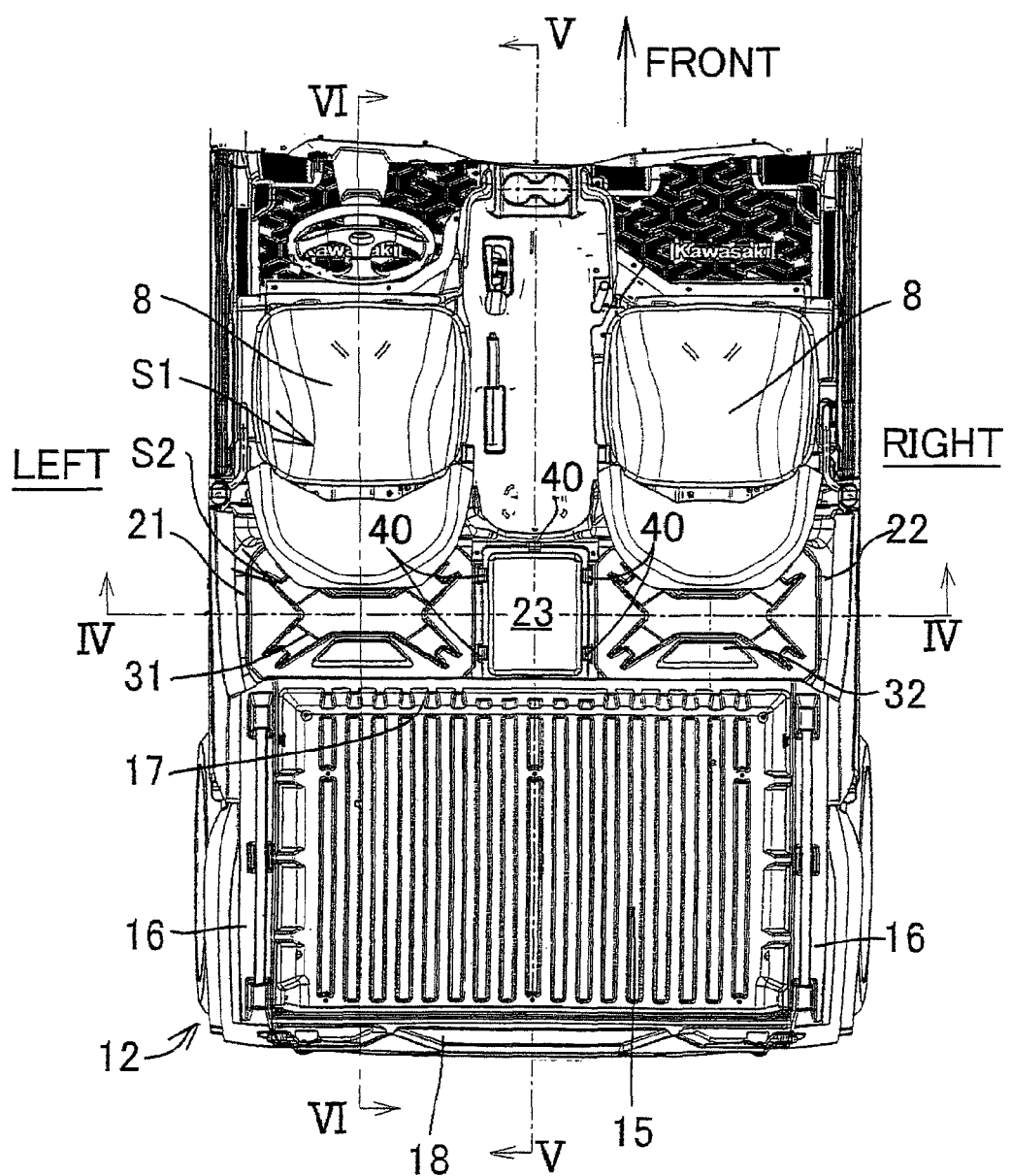
FIG. 3 is a plan view of the utility vehicle of FIG. 1.

FIG. 3 is a plan view of the utility vehicle of FIG. 1, and a tray 23 formed in a rectangular shape when seen from above, the tray for disposing a cooler box, is arranged between the left and right storage boxes 21, 22 in the storage space S2. Hooks 40 engageable with ends of a rubber band 56 (refer to FIG. 12) for fixing the cooler box are formed in left and right ends and both front and rear ends of the tray 23.

Figure 6:
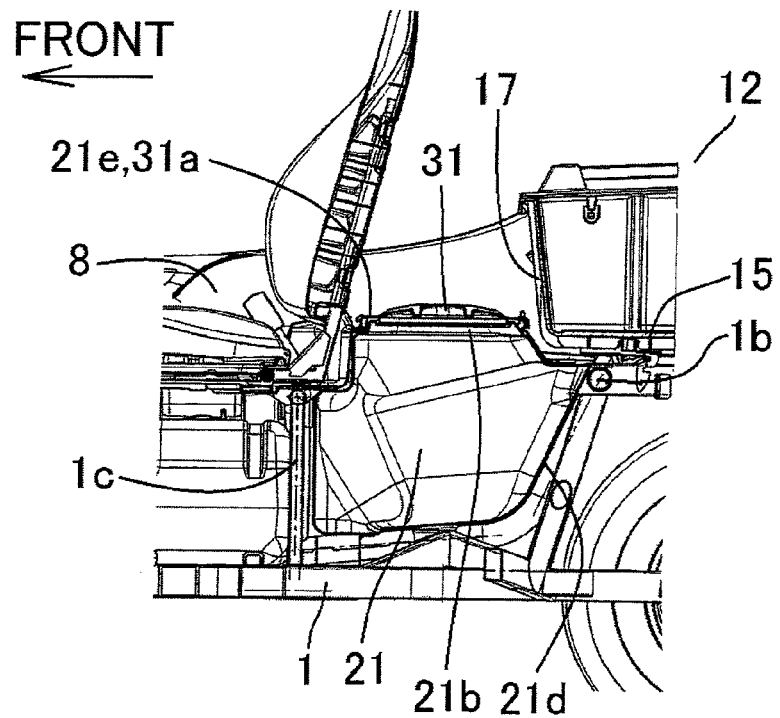
FIG. 6 is a sectional view by line VI-VI of FIG. 3.
Figure 7:
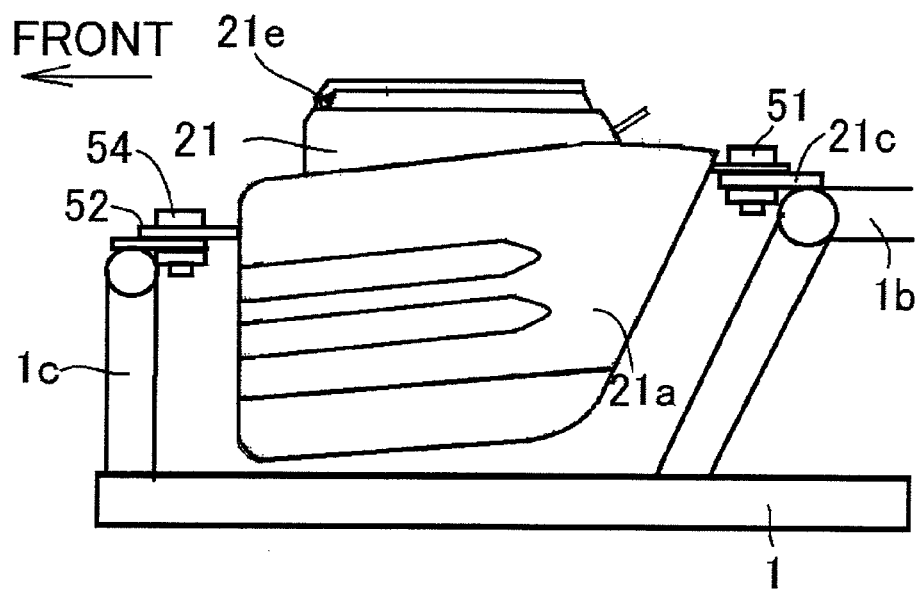
FIG. 7 is a left side view of a left storage box.
Figure 8:
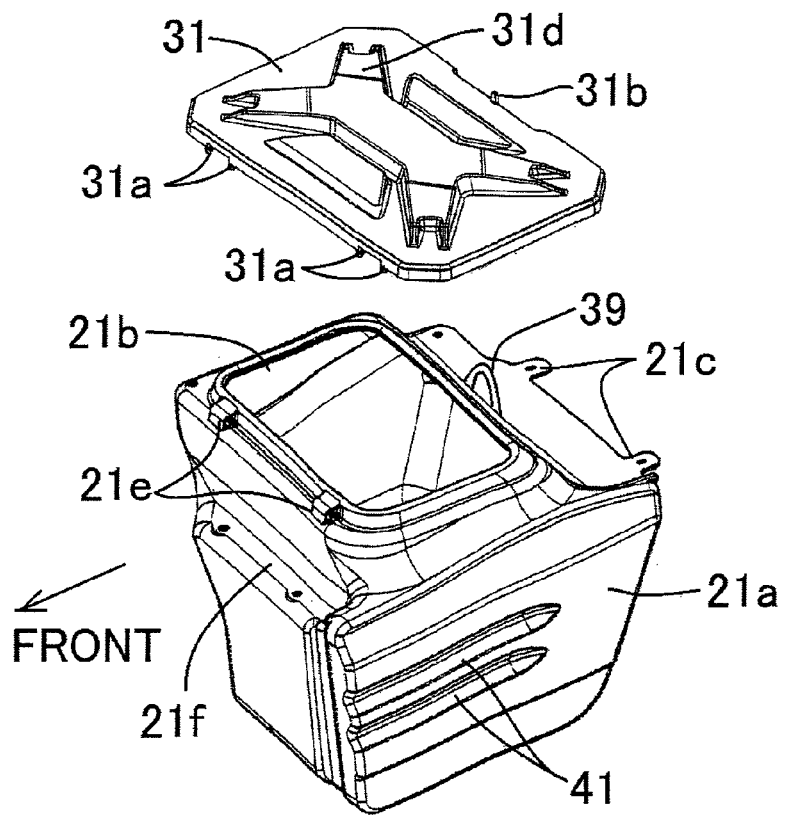
FIG. 8 is a perspective view in which the left storage box is seen from upper left.
Figure 9:
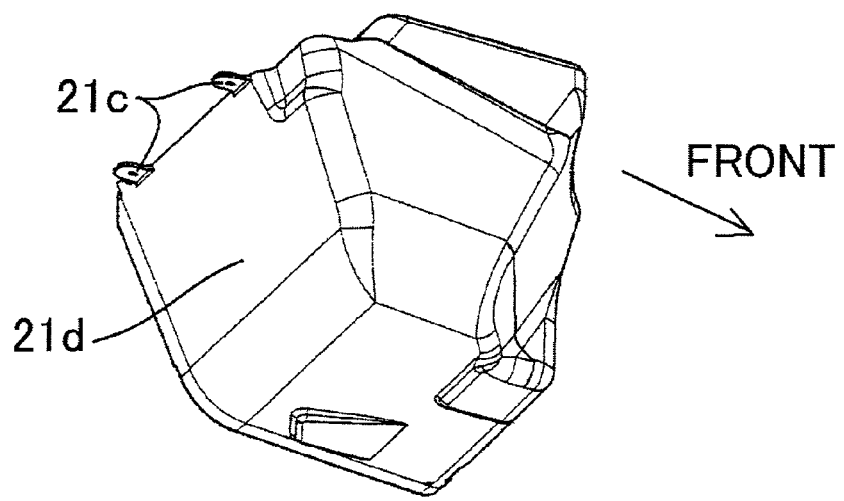
FIG. 9 is a perspective view in which the left storage box is seen from rear lower.

FIG. 6 is a sectional view by line VI-VI of FIG. 3, FIG. 7 is a left side view of the left storage box 21, FIG. 8 is a perspective view in which the left storage box 21 is seen from upper left, and FIG. 9 is a perspective view in which the left storage box 21 is seen from rear lower. In FIG. 8, the left storage box 21 is a resin blow-molded member formed in a rectangular shape when seen from above, and a rectangular opening 21b elongated in the lateral direction is formed in an upper wall thereof. A horizontal section area of the opening 21b is formed to be smaller than the upper wall and a horizontal section area of a trunk part of the storage box 21. The side cover 21a is integrated with the storage box 21 on the left side surface of the storage box 21. A plurality of ribs 41 extending in the front and rear direction is integrated with the side cover 21a.

In a rear end of the upper wall of the left storage box 21, a pair of left and right plate shape attachment portions 21c protruding rearward is integrated with the left storage box 21. In a front wall of the left storage box 21, an attachment step portion 21f having a pair of left and right attachment holes is formed. In a front end of the opening 21b, a pair of left and right hinge portions (boss portions) 21e forming the hinge mechanism for supporting the lid is integrated with the left storage box 21.

Hinge portions 31a coupled to the hinge portions 21e of the left storage box 21 pivotably via hinge pins are integrated in the front end of the lid 31, and a hook portion 31b engaged with a locking ring rubber 39 for locking the lid 31 into a closed state is integrated with the lid 31 in the rear end of the lid 31. Ribs 31d arranged in a substantially X shape when seen form above are formed in the lid 31.

In FIG. 9, left and right walls and the front wall of the left storage box 21 are formed substantially perpendicularly. Meanwhile, a rear wall 21d of the left storage box 21 is inclined rearward toward the upper side. Thereby, the horizontal section area of the trunk part of the left storage box 21 is gradually widened from a lower end toward the upper side.

In FIG. 6, in the embodiment, the upper walls of the left and right storage boxes 21, 22 are higher than the bottom plate 15 of the cargo bed 12. Thereby, capacity of the storage box 21 is ensured to be large.

In FIG. 7, the attachment portions 21c on the rear side of the left storage box 21 are disposed on a front upper end of a cargo bed support frame portion 1b of the chassis 1 from above, and fixed by bolts 51 from above.

An attachment piece 52 extending forward is secured to the attachment step portion 21f on the front side of the left storage box 21, and the attachment, piece 52 is disposed on a head of a seat support base 1c standing on the chassis 1 from above and fixed by bolts 54 from above.

Figure 10:
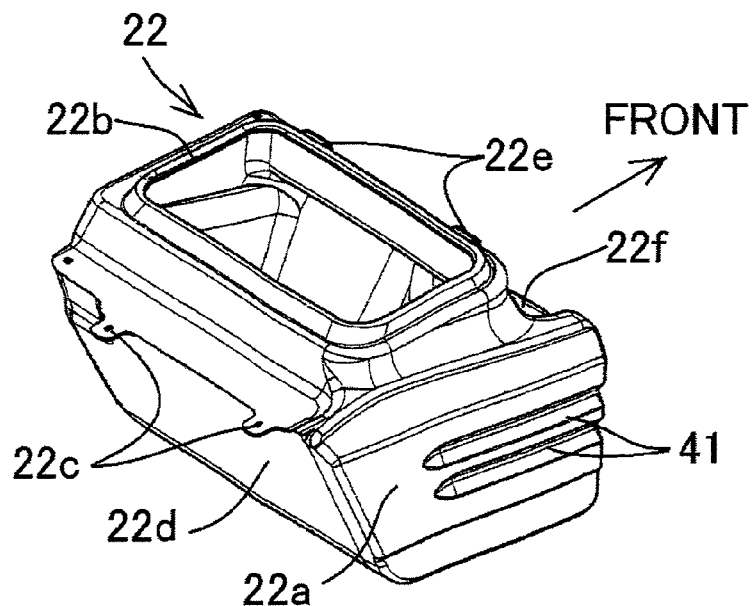
FIG. 10 is a perspective view in which a right storage box is seen from upper left.
Figure 11:
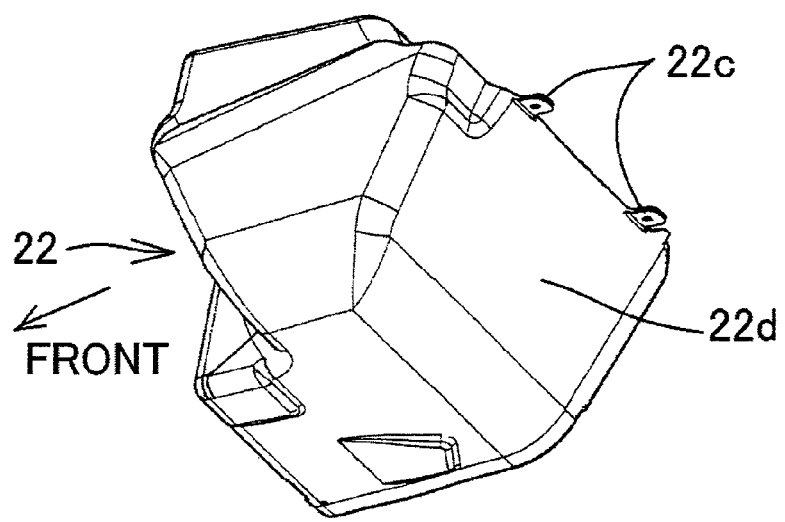
FIG. 11 is a perspective view in which the right storage box is seen from rear lower.

FIG. 10 is a perspective view of the right storage box 22 seen from the right upper side, and FIG. 11 is a perspective view of the right storage box seen from rear lower. The right storage box 22 is also a resin blow-molded member. The right storage box 22 is formed in a substantially bilaterally symmetrical shape to the left storage box 21, and the side cover 22a is integrated with the right side surface of the right storage box 22. As well as the left storage box 21, a rectangular opening 22b, plate shape attachment portions 22c on the rear side, an attachment step portion 22f of the front wall, and a pair of left and right hinge portions (boss portions) 22e for supporting the lid are integrated. Configurations of those members are already described with the left storage box 21 and omitted herein. Ribs 41 are formed in the side cover 22a. It should be noted that the right lid 32 shown in FIG. 3 and the like is the same as the left lid 31 of FIG. 8.

Figure 4:
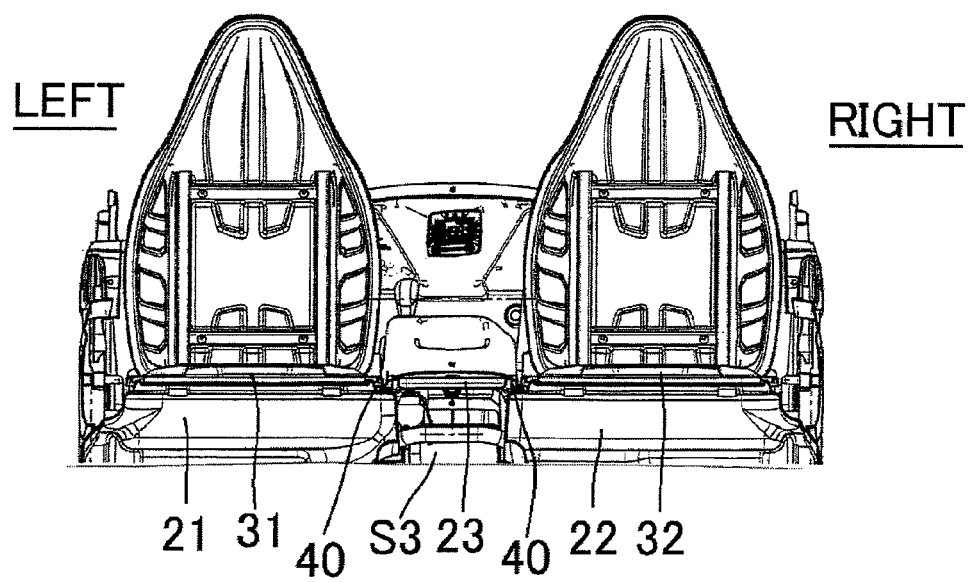
FIG. 4 is a sectional view by line IV-IV of FIG. 3.
Figure 5:
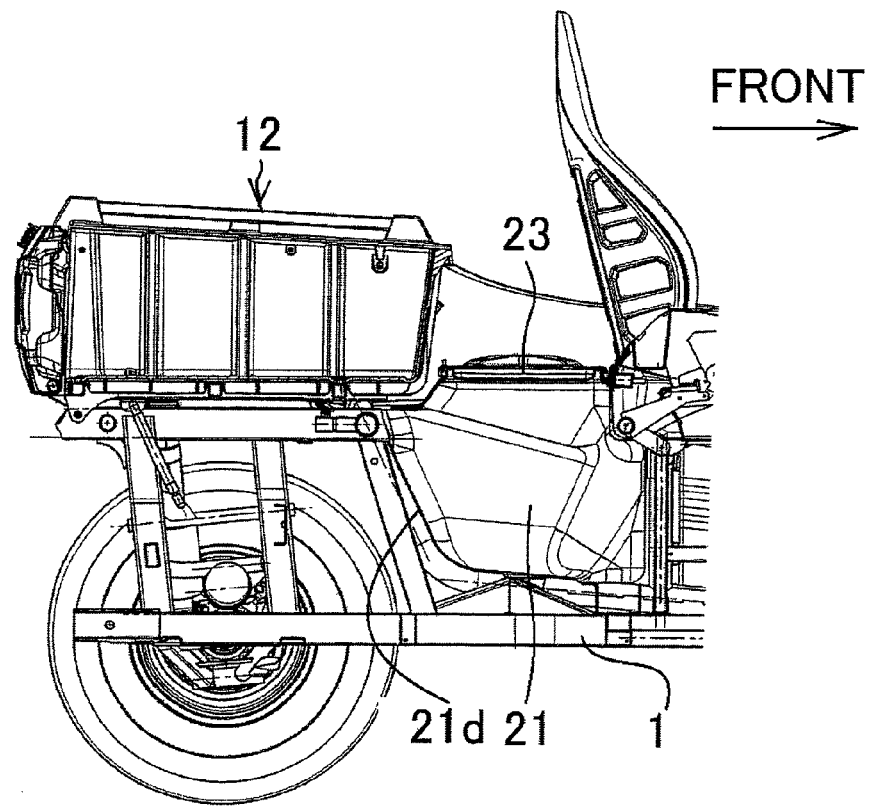
FIG. 5 is a sectional view by line V-V of FIG. 3.

FIG. 4 is a sectional view by line IV-IV of FIG. 3, and FIG. 5 is a sectional view by line V-V of FIG. 3. In FIGS. 4 and 5, the tray 23 for disposing the cooler box is formed in a planar shape. Both the left and right ends of the tray 23 are fixed and supported onto heads of the left and right storage boxes 21, 22, and the front and rear ends of the tray 23 are fixed to the chassis 1. For example an exhaust pipe of an engine or the like is arranged in a space S3 formed between the tray 23 and the left and right storage boxes 21, 22.

Figure 12:
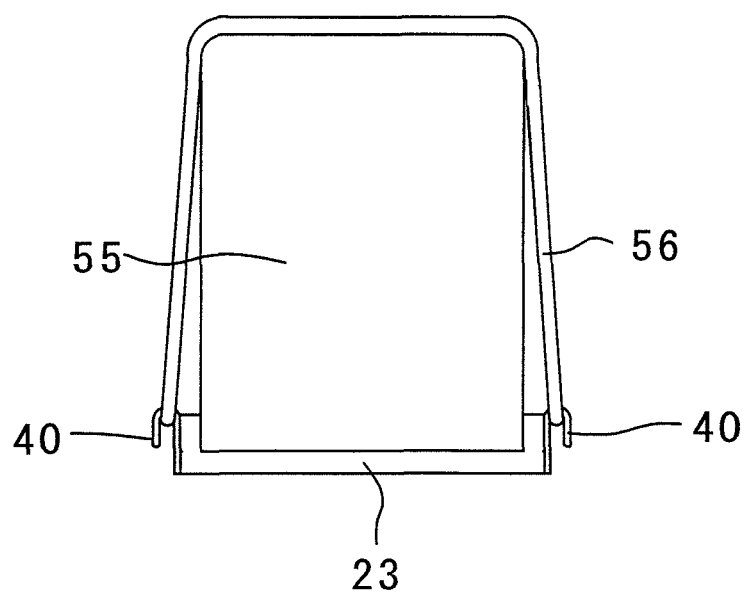
FIG. 12 is a sectional view of a tray in a state that a cooler box is loaded.

FIG. 12 is an enlarged sectional side view of the tray 23 showing a state that a cooler box 55 is loaded, and the hooks 40 described above are formed in an inverted U shape. The cooler box 55 disposed on the tray 23 is fixed by the rubber band 56 caught on the hooks 40. As a matter of course, items other than the cooler box 55 can be disposed and fixed by the band 56.

Operations and Effects of the Embodiment (1) In FIG. 8, for example in a case where clothes, lunch boxes, or the like are accommodated in the left storage box 21, the locking rubber 39 locking the rear end of the lid 31 is removed, and the rear end of the lid 31 is pulled up about the hinge portions 21e, 31a of the front end. Thereby, the lid 31 is opened. Then, the items are accommodated from the head opening 21b and the lid 31 is closed again and locked.

(2) In addition to the existing cargo bed 12, the storage boxes 21, 22 capable of protecting a cargo from mud, water, or the like of an exterior are provided in the space S in the ROPS 5. Thus, the cargo accommodated in the storage boxes 21, 22 can be protected from mud or water of the exterior without separately putting a cover sheet or the like. For example, clothes and the like of the passenger can be easily loaded in a state that mud or water does not scatter on the clothes and the like.

(3) The storage boxes 21, 22 are integrated with the side covers 21a, 22a of the vehicle. Thus, the number of parts for surrounding an outer peripheral part of the vehicle can be reduced.

(4) The pair of left and right storage boxes 21, 22 is provided, the right wall of the right storage box 22 forms the right side cover 22a, and the left wall of the left storage box 21 forms the left side cover 21a. Thus, in comparison to a case where a storage box ranging over the entire width of the vehicle is manufactured, a mold can be simplified and downsized.

(5) The tray 23 for disposing the cooler box is provided between the pair of left and right storage boxes 21, 22. Thus, the space between the left and right storage boxes 21, 22 can be effectively utilized for disposing the cooler box.

(6) The tray 23 is provided with the hooks 40 onto which the rubber 56 or a string for fixing the cooler box 55 is caught. Thus, fall-down of the cooler box 55 due to vibration of the vehicle can be prevented, and by elastically fixing, a cooler box having different size and shape can be fixed in a stable state.

(7) The openings 21b, 22b narrower than the trunk parts of the storage boxes 21, 22 are formed in the heads of the storage boxes 21, 22. Thus, water or mud does not easily invade the storage boxes 21, 22 at the time of running in a marshy place or the like.

(8) The storage boxes 21, 22 have the lids 31, 32 in the head openings 21b, 22b, and the lids 31, 32 are formed in such a manner that the rear ends are opened and closed. Thus, at the time of opening and closing the lids 31, 32, backrests of the front seats 8 are not disturbing, and even with higher storage boxes 21, 22, the lids are easily opened and closed.

(9) The storage boxes 21, 22 are formed to be higher than the bottom plate 15 of the cargo bed 12. Thus, the capacity of the storage boxes 21, 22 can be increased.

Figure 13:
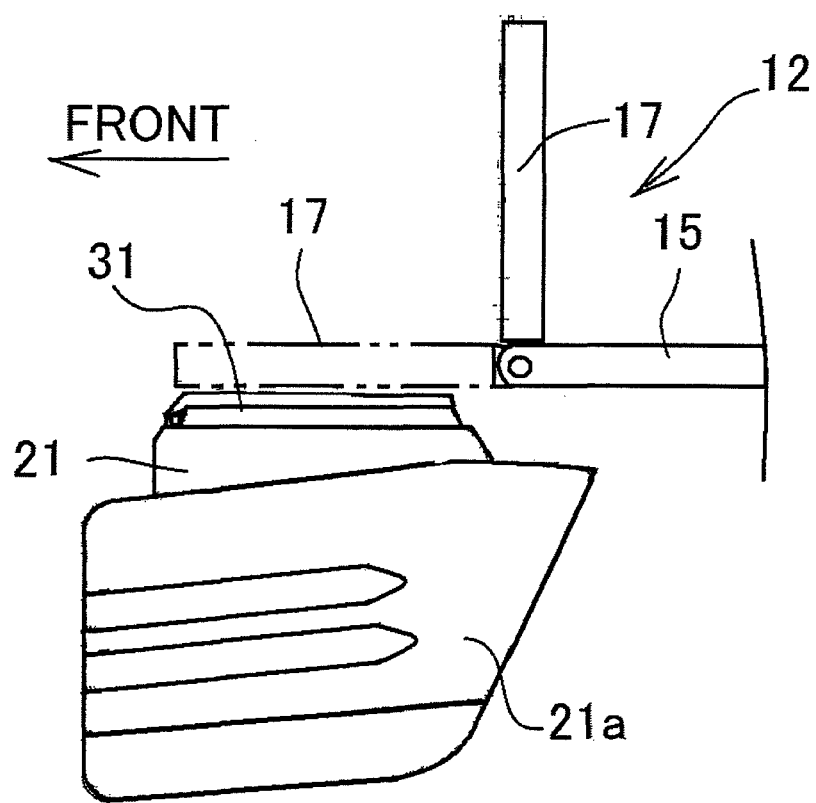
FIG. 13 is a schematic side view showing a deformation property of the storage box.

Other Embodiments (1) As in FIG. 13 showing other embodiment, height of the storage boxes 21 (and 22) is formed to be the same as or lower than the bottom plate 15 of the cargo bed 12. According to this, as shown by an imaginary line, in a structure that the front panel 17 of the cargo bed 12 is opened forward, the upper surfaces of the storage boxes 21 (and 22) can be utilized as an extended part of a bottom surface of the cargo bed 12, so that a cargo longer than the cargo bed 12 can be loaded.

(2) The present invention is not limited to the structure of the above embodiment but includes various modified examples considered within a range not departing from the content described in the claims.

What is claimed is:

1. A utility vehicle comprising:
    a chassis;
    a ROPS surrounding a space on the chassis;
    a seat or a seat row arranged in the space;
    a cargo bed provided in a rear part of the chassis; and
    one or more resin storage boxes provided between the seat or the seat row and the cargo bed in the front and rear direction in the space, the storage boxes being integrated with parts of vehicle-side covers covering side parts of the space.

2. The utility vehicle according to claim 1, wherein
    the storage boxes include a right storage box and a left storage box,
    a right wall of the right storage box forms a part of the right vehicle-side cover, and
    a left wall of the left storage box forms a part of the left vehicle-side cover.

3. The utility vehicle according to claim 2, wherein a tray for disposing a cooler box is provided between the left and right storage boxes.

4. The utility vehicle according to claim 3, wherein the tray is provided with a hook onto which a rubber or a string for fixing the cooler box is caught.

5. The utility vehicle according to claim 1, wherein an opening narrower than a trunk part of the storage box is formed in a head of each of the storage boxes.

6. The utility vehicle according to claim 1, wherein
    each of the storage boxes has a lid in the head opening, and
    the lid is formed in such a manner that a rear end of the lid is opened and closed taking a front end hinge portion of the lid as a pivot center.

7. The utility vehicle according to claim 1, wherein the storage boxes are formed to be higher than a floor surface of the cargo bed.

8. The utility vehicle according to claim 1, wherein height of the storage boxes is the same as or lower than a bottom surface of the cargo bed.

* * * * *